April 29, 1969 J. V. MIZZI 3,441,908

DATA STORAGE SYSTEM

Filed June 18, 1965 Sheet 1 of 7

INVENTOR
JOHN V. MIZZI

BY Owen Lamb

AGENT

United States Patent Office 3,441,908
Patented Apr. 29, 1969

3,441,908
DATA STORAGE SYSTEM

John V. Mizzi, Highland, N.Y., assignor to International Business Machines Corporation, Armonk, N.Y., a corporation of New York Filed June 18, 1965, Ser. No. 464,910
Int. Cl. G11b *13/00, 31/00;* G11c *5/02*
U.S. Cl. 340—172.5 17 Claims

ABSTRACT OF THE DISCLOSURE

Apparatus for controlling the sequence in which data are stored and retrieved from a data store. The apparatus comprises a sequence matrix provided with bi-stable storage devices in rows and columns of the matrix. Each individual memory area in the data store has an associated area-full tag in the matrix. Each individual memory area also has a control bit register arranged in columns of the matrix having control bits identifying each of all of the remaining memory areas. When an individual memory area is loaded, its area-full tag is turned on. All remaining areas which have information stored in them will have area-full tag bits on from a preceding operation. When a memory area is loaded, its control bits in the column associated with that area are turned on in rows in which other area-full tag bits are on. Whenever information is read from a memory area, its area-full tag and all of the control bits in the row where that tag resides are reset to zero. Thus, the matrix maintains current information as to the sequence of utilization and the current usage of each memory area. This is accomplished by decoding circuits which decode the combination of sequence control bits within the matrix.

This invention relates to a data storage system, and more particularly to apparatus for controlling the sequence in which data are stored and retrieved from a data store.

It is often desirable in information handling systems to automatically control the sequence in which data are stored in or retrieved from a memory. For example, the storage may be controlled on a "first-in, first-out" basis This ensures that when a request for retrieval of information from storage is made, the first segment of information stored is the first segment of information read out.

It may also be desirable to arrange information in a "push-down list" form. A push-down list controls the storage in a "last-in, first out" manner. The list is not addressable, but when data are requested, the top word on the list is read out and removed and the lower words on the list are "pushed up" one position in priority. When a word is read into a push-down list, the new word becomes the top word and all the other words are pushed down one position in priority.

In one prior "push-down" list system, a recirculating memory is utilized. To establish the beginning of the list, a one-bit is inserted in the memory and recirculated. To read a character into the memory system, the one-bit is deleted and a new character is read in at the head of the list. The one-bit is then reinserted in front of the new character.

To delete and read out a character from memory, the one-bit is sensed and the character following the one-bit is read out. The one-bit is replaced back at the head of the list by inserting the bit in place of the last bit of the character deleted.

In another prior system, a ring control circuit is used to control the reading of information into a series of registers. In this type of system, the ring is stepped to the next register position filled. When a register position is emptied, the ring is stepped back one position.

In the above described systems and in other systems, flexibility is limited to the particular type of control chosen initially. For example, in a last-in, first-out system, there is no way to determine which information was first in. The system may be redesigned to provide for first-in, first-out operation, but then loses the ability to be operated as a last-in, first-out system.

It is therefore an object of this invention to provide an improved sequence-control apparatus for a memory.

It is a further object of this invention to provide a sequence-control apparatus which fully indicates for each segment of information stored in the memory, the sequence in which the information was received.

It is also an object of this invention to provide an apparatus for removing information stored sequentially in a memory and for modifying the sequence control information accordingly.

Briefly, the above objects are accomplished in accordance with the invention by providing each individual memory area of a memory with an area-full tag. Each individual memory area also has a control bit register having control bits identifying each of all the remaining memory areas to be controlled. When an individual memory area is loaded, its area-full tag is turned on. All remaining areas which have information stored in them have area-full tag bits on. When a memory area is loaded, its control bits in positions identifying other full memory areas are turned on.

Whenever information is read from a memory area, its area-full tag is set to zero and all of the control bits in each other memory area indicating the area just read out are reset to zero. Sequence control information is derived by examining the number of control bits which are energized for a given individual memory area. The number of control bits on plus one indicates the numerical sequence in which the information was entered into the memory. Thus, if no control bits are on, but the area-full tag bit is on, that individual memory area was "first-in"; if one and only one control bit is on, that memory area was "second-in"; etc.

The invention has the advantage that any desired sequence of loading and unloading the memory may be accomplished by appropriate decoding of area-full tag bits and sequence control bits.

The invention has the further advantage that for a static memory, simple bistable devices may be arranged in a matrix without any necessity for critical timing control.

The invention has the further advantage that the concepts are easily adapted to dynamic memories of the recirculating type including, but not limited to, magnetic recording drums, discs, tapes, or recirculating delay line memories.

The invention has the further advantage that the concepts taught may be easily adapted to a stored program controlled memory system.

The foregoing and other objects, features, and advantages of the invention will be apparent from the following more particular description of a preferred embodiment of the invention, as illustrated in the accompanying drawings.

In the drawings:

FIG. 1 is a block diagram of a memory system embodying the invention;

FIGS. 2*a*–2*i* illustrate in block form a typical sequence of operations for control of a memory in accordance with the invention;

Figure 1:
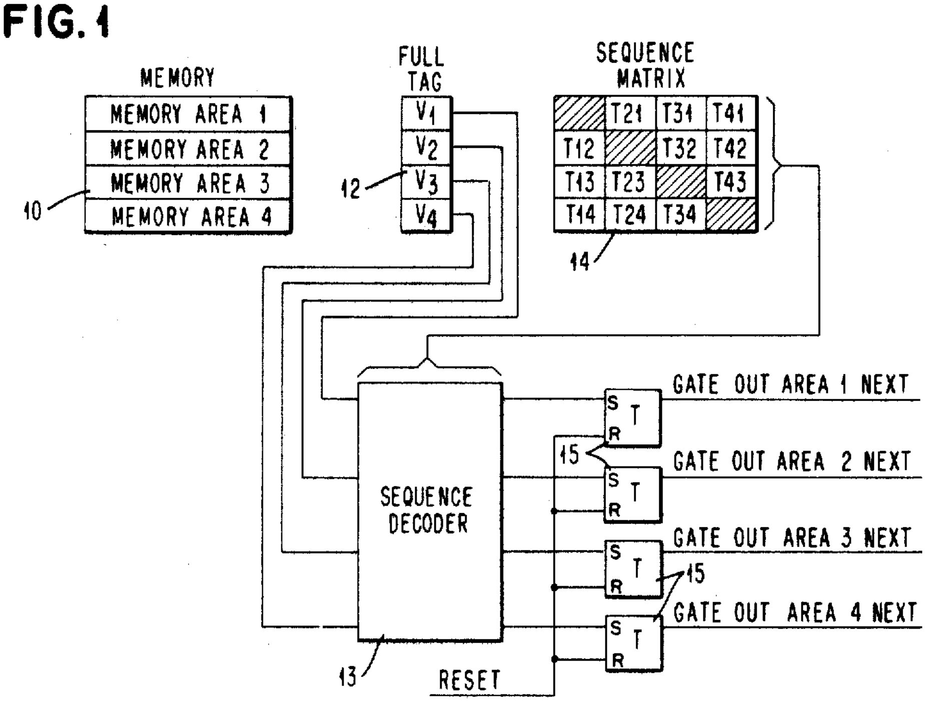

Referring now to FIG. 1, a memory 10 is shown which comprises a total of four memory areas 1–4. A full tag register 12 has storage elements V1–V4, each associated with one of the memory areas. The outputs of the stages of the full tag register 12 are applied to a sequence decoder 13. A sequence control matrix 14 is provided, which is comprised of bistable devices T12–T13 . . . in all positions of the matrix except the principal diagonal, shown shaded. The outputs of the storage positions of the sequence matrix are also applied to the sequence decoder 13. The sequence decoder delivers four output lines which set one of four latches 15, the outputs of which indicate which memory area location should be gated out next.

Figure 2A:
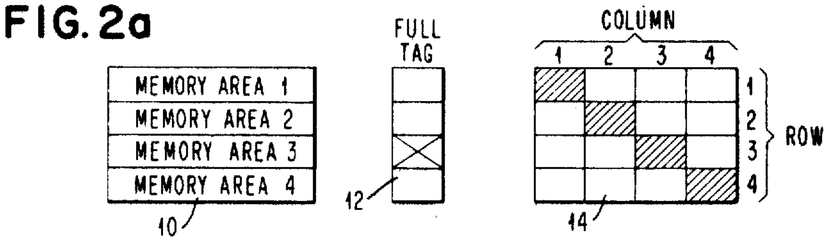

Whenever a memory area is filled, its area full tag is turned on. Thus, assuming memory area 3 is loaded first, full tag register position V3 is turned on, indicating that the memory area 3 contains a valid segment of information (see FIG. 2*a*).

Also, whenever a memory area is filled, certain control bits in the sequence matrix 14 are turned on. Each column and each row in the sequence matrix 14 corresponds to one of the memory areas 10. The sequence control bits in column 1 correspond to memory area 1 and there is one control bit T12, T13, T14 for each of the remaining memory areas 2, 3, and 4 respectively. Column 2 is associated with memory area 2 and has control bits in all of the other memory area location rows with the exception of memory area 2; thus, the control bits T21, T22, and T24 are provided. Columns 3 and 4 are arranged in a similar manner.

Figure 2B:
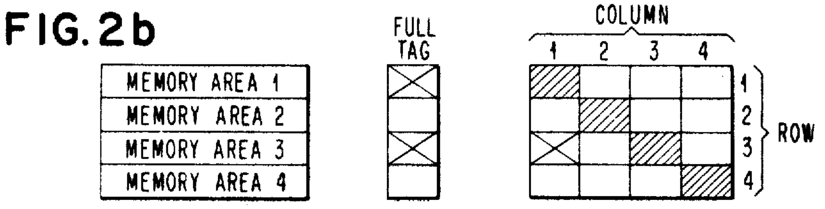

Whenever a memory area is filled, the sequence control bits in the column corresponding to the just-filled memory area are turned on but only in row positions where there is a corresponding area full tag bit on. For example, if memory area 1 is now filled after having just filled memory area 3, the control bits in column 1 are turned on in those locations in which the area full tag is on. Since the area full tag is on in memory area 3, tag V3, is on and thus the sequence control bit T13 is turned on, as shown in FIG. 2*b*.

The invention will now be described with reference to FIGS. 2*a*–2*g*, by following through a typical loading and unloading sequence where the memory areas are loaded in the following sequence: 3, 1, 4, 2, and unloaded in a first-in, first-out sequence.

Referring again to FIG. 2*a*, memory area 3 was loaded and its area full tag, V3, was turned on as indicated by a cross in the appropriate position of full tag register 12. No change was made in the bistable devices of the matrix 14 because no other area full tags are on.

Referring again to FIG. 2*b*, the next memory area filled in the sequence chosen was memory area 1. As memory area 1 was filled, its area full tag bit was turned on. Now, since the area full tag from memory area 3 was on, the matrix bit at the intersection of column 1 and column 3 was turned on.

Figure 2C:
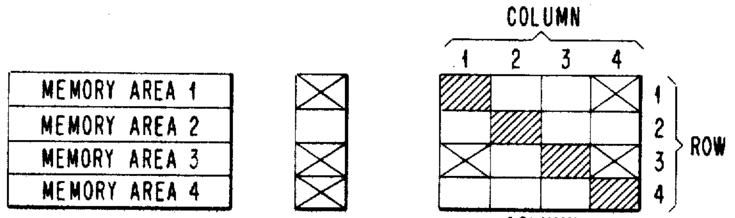

Referring to FIG. 2*c*, the next area filled in the sequence is memory area 4. Its area full tag is turned on and at the same time bistable devices in column 4 are turned on corresponding to those memory area positions whose full tags are on; thus, the matrix bits in column four at row positions 1 and 3 are turned on.

Figure 2D:
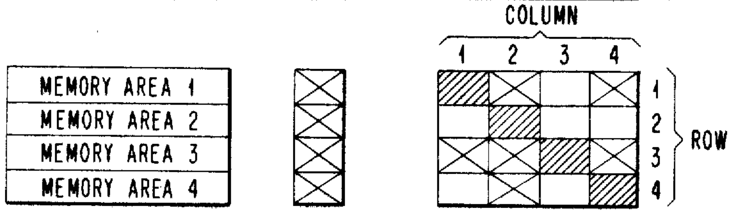

Referring to FIG. 2*d*, the last area filled in the sequence is memory area 2. In column 2, all of the row positions are turned on corresponding to memory area positions which have full tag on.

Figure 2E:
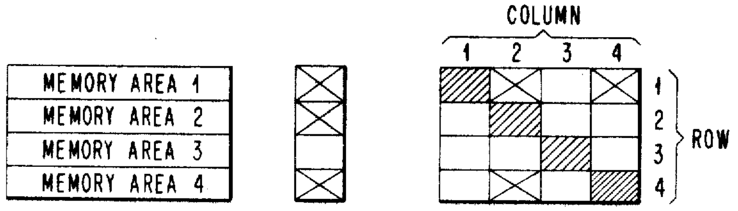

Assuming first-in, first-out sequence operation, the first register loaded may be determined by locating the column position which has no control bits on but which has an area full tag bit on. The only position that satisfies this requirement is memory area 3. In FIG. 2*e*, if memory area 3 is read out, all of the bits in row 3 of matrix 14 are reset along with the area 3 tag bit in the full tag register 12.

Figure 2F:
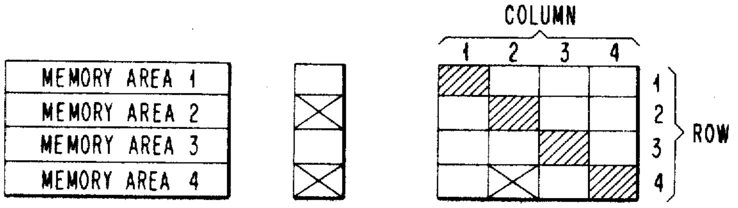

Now, the next area in the sequence to be read out is identified by again locating the column position having all zeros and a full tag bit on. The only area which satisfies this requirement is area 1. It is true that column 3 has no sequence bits on but it is also true that the area full tag is not on, and thus, it does not fulfill that requirement. When register 1 is read out, its area full tag is reset, and all of the matrix bits in row 1 are reset as shown in FIG. 2*f*.

Figure 2G:
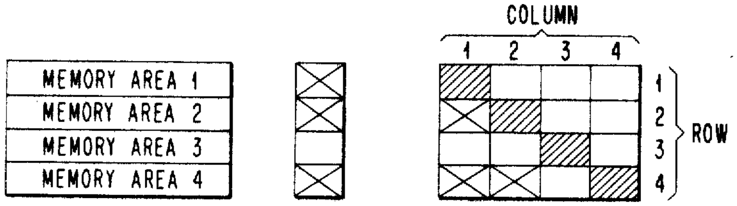

Assume now, for purposes of illustration, that it is desired to immediately refill memory area 1. As shown in FIG. 2*g*, the area full tag for memory area 1 is turned on and in the sequence matrix 14, sequence control bits in column 1 are turned on in each row position having an area full tag on; i.e., rows 2 and 4.

Figure 2H:
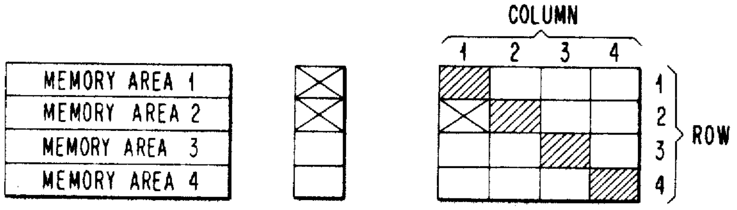
Figure 2I:
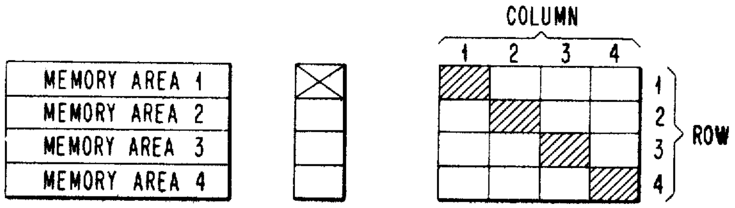

It is apparent that the sequence of unloading will not be disturbed by the fact that memory area 1 was reloaded. By examining the sequence matrix, it is found that the only memory area which has a tag bit on but no sequence bits on in its corresponding column is memory area 4, which is the proper memory area to maintain the original sequence of unloading as previously assumed. Thus, in FIG. 2*h*, when memory area 4 is read out, its area full tag is reset, and all of its sequence control bits in row 4 are also reset. The next memory area having a tag bit on but no sequence control bits on in its corresponding column is memory area 2, the next area loaded in the original sequence. In FIG. 2*j*, memory area 2 is read out, its full tag reset, and all of the sequence control bits in row 2 are reset. This leaves only memory area 1 which was the last area in which information was read.

Figure 3:
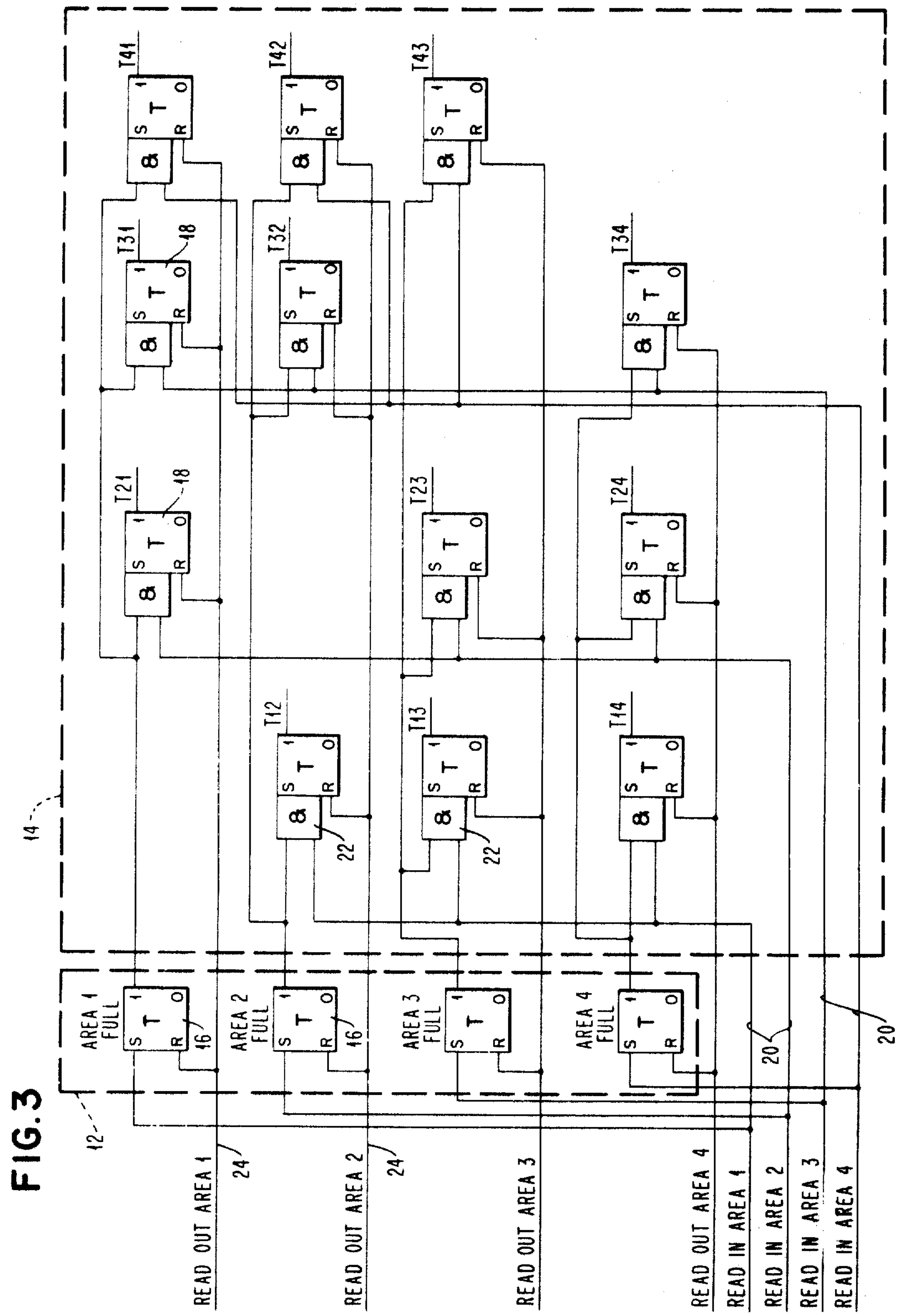
FIG. 3 is a block schematic diagram of a memory area-full tag register and a sequence control matrix constructed in accordance with the invention.

One embodiment of the full tag register 12 and control matrix 14 is shown in FIG. 3. Memory area 10 is not shown because this can be easily constructed by one having ordinary skill in the art. For example, the memory area may be compised of, but not limited to, a group of magnetic switch cores or a group of registers comprised of set-reset latches.

In FIG. 3, the full tag register 12 is comprised of area-full latches or triggers 16 corresponding in number to the number of memory areas to be controlled. In this example, four such areas are shown and thus four triggers 16 are illustrated.

The sequence control matrix 14 is comprised of a group of set-reset latches 18 arranged in rows and columns. Signal lines 20 are provided for energization in response to the reading of data into memory areas 1–4. The signal lines 20 also operate to set the area-full trigger corresponding to the memory area read-in. The read-in area signal line 20 also energizes AND circuits 22 in the appropriate column corresponding to the area read in. Thus, read-in area 1 line 20 energizes AND circuits 22 in column 1.

Read-out area signal lines 24 are provided for each memory area controlled. These signal lines operate in response to the reading out of data from a particular memory area and are connected to each latch in a row corresponding to that area. Thus, "read-out area 1" line 24 resets all of the latches in row 1.

In the description of FIG. 3, assume the same sequence of reading into and out of memory is followed as in the example above. First, information is read into memory area 3. "Read-in area 3" line 20 is energized, which turns on the area 3 full trigger and also energizes all of the AND circuits 22 located in column 3.

Since no other area-full latches are on and since there is no corresponding sequence control latch in column 3 for area 3 full latch, no sequence control latches are turned on.

The next memory area filled is memory area 1. The "read-in area 1" line 20 is energized, which turns on the area 1 full latch. At the same time, the "read-in area 1" line energizes all of the AND circuits in column 1. Since the area 3 full latch is on, the output from the AND circuit 22 at the intersection of column 1 and row 3 is energized, thus turning on the appropriate sequence control latch T13.

The next memory area filled is memory area 4. "Read-in area 4" line 20 is energized, turning on area 4 full latch and also energizing one leg of the AND circuits 22 in column 4. Since the area 1 and area 3 full latches are on, an output from the AND circuits 22 in rows 1 and 3 occurs, turning on the corresponding sequence control latches T41 and T43.

The next area filled is memory area 2, the operation of which is similar to that described.

Whenever a memory area is read, the control bits in its corresponding row are reset. For example, if memory area 1 is read, read out area 1 line 24 is energized, resetting area 1 full latch 16, and control bit latches T21, T31, T41.

The sequence decoder 13 of FIG. 1 may take on many forms, depending upon the particular operation desired. For example, in FIG. 4, the sequence matrix 14 is decoded to provide a first-in, first-out operation of the memory 10. This is accomplished by combining the sequence control bits for each column in an OR circuit 40 and ANDing the inverted output of the OR with the corresponding area-full tag. The result is that if any of the control bits in a particular column are on, the inverted output from the OR degates the AND circuit 44.

Figure 5:
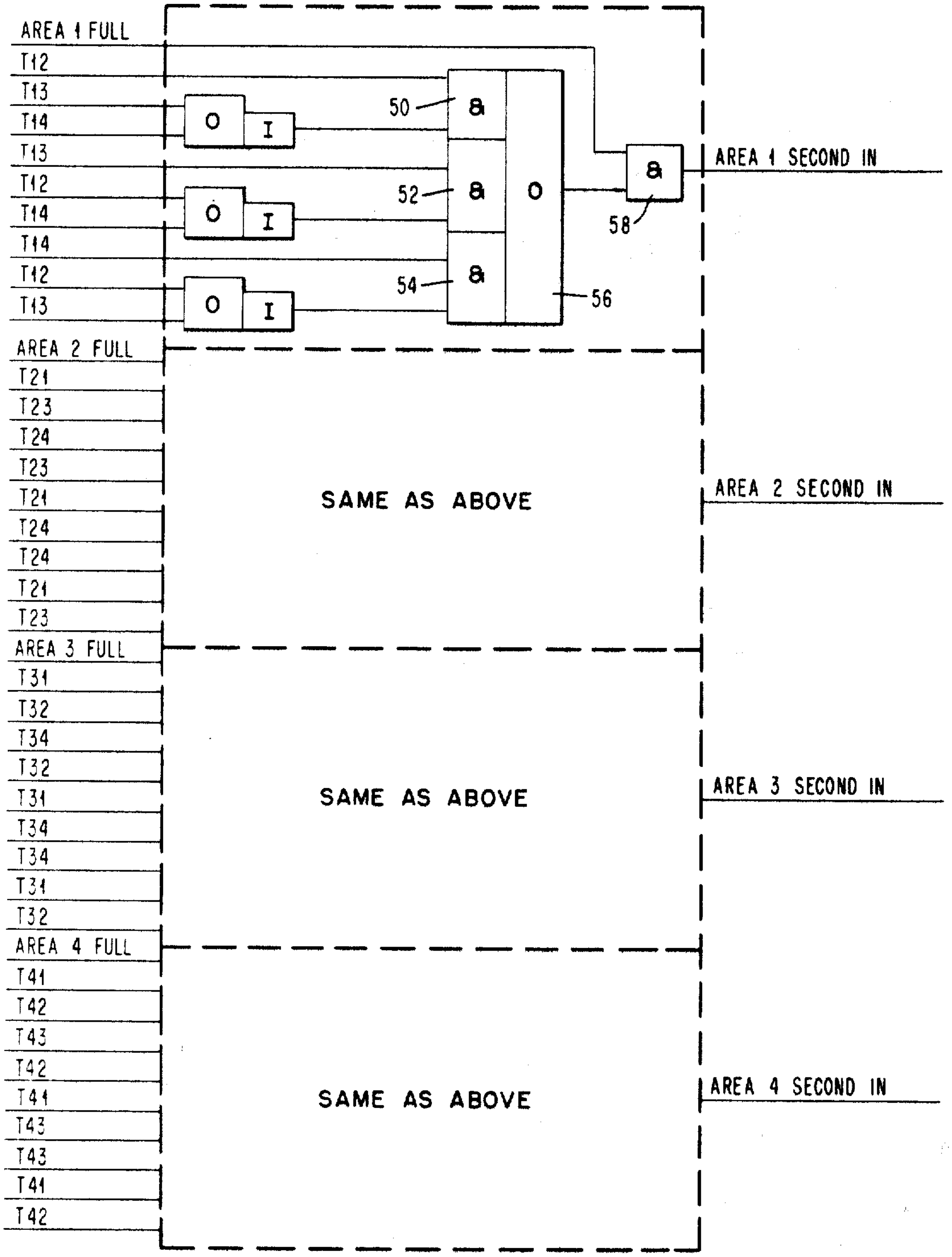
FIG. 5 is a decoder circuit for decoding outputs from the register and matrix of FIG. 3 for indicating which memory area was loaded secondly.

FIG. 5 illustrates the logic necessary to determine, from the sequence control bits, which area was loaded secondly in the cycle. The area which was loaded secondly will have one, and only one, of its sequence control bits on in addition to its area-full latch turned on. The logic in FIG. 5 decodes this condition by combining for column 1, T12 and $\overline{\text{T13 or T14}}$, in an AND circuit 50. Similarly, in AND circuit 52, T13 is combined with the $\overline{\text{T12 or T14}}$ and in AND circuit 54, T14 is combined with $\overline{\text{T12 or T13}}$. The outputs of the AND circuits 50, 52, 54 are combined in an OR circuit 56, the output of which is ANDed with the area 1 full latch in AND circuit 58. Thus if any one, but only one, of the control bits for column 1 is on at the same time the area 1 full latch is on, the output "area 1 second-in" is energized to signify that area 1 was the second area loaded. Similarly circuitry is provided for areas 2, 3, and 4.

Figure 6:
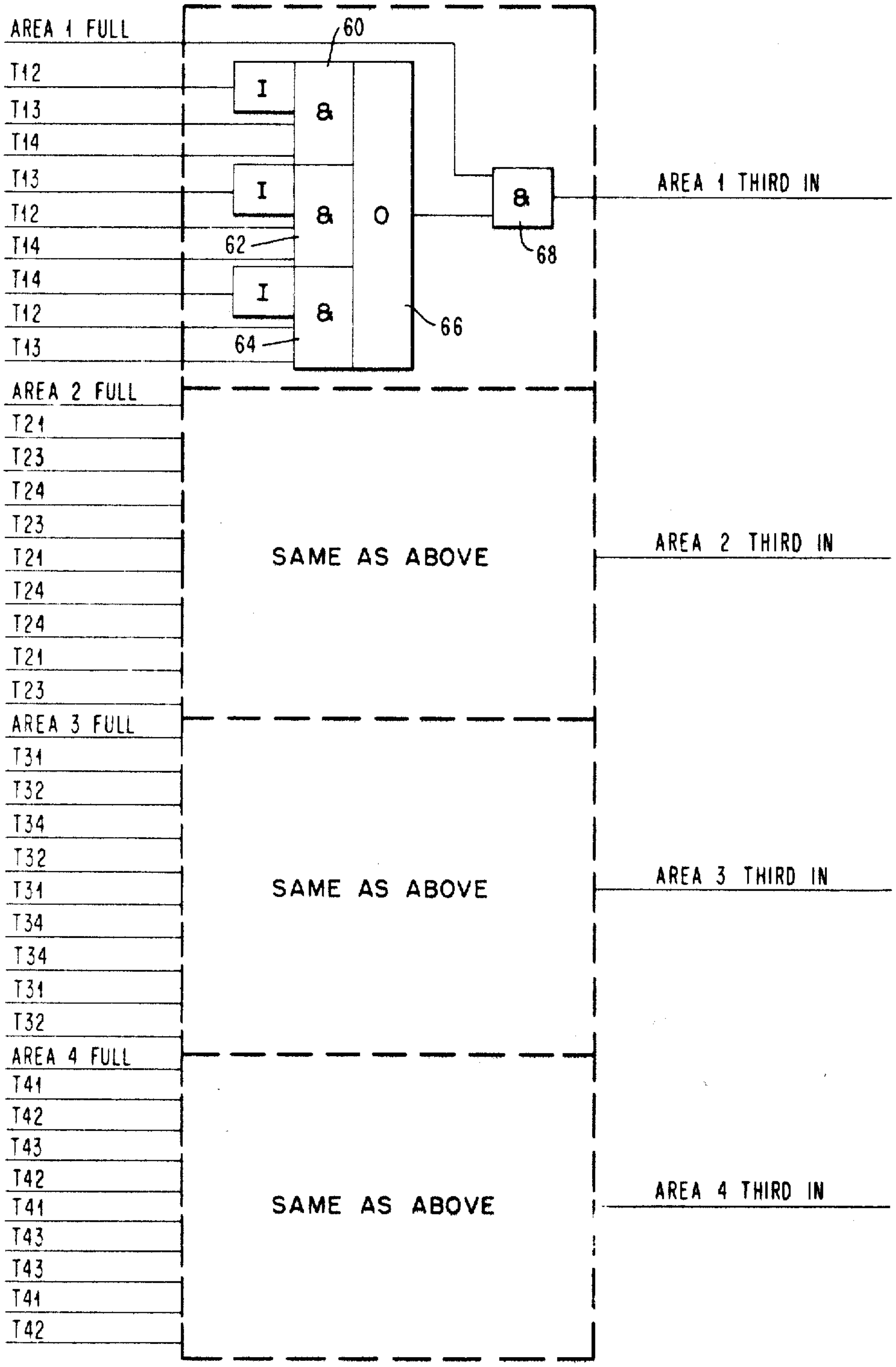
FIG. 6 is a decoder circuit for decoding the outputs from the register and matrix of FIG. 3 for indicating the memory area which was loaded thirdly.

FIG. 6 illustrates the circuitry necessary to construct a decoder which will indicate which area was loaded thirdly in the cycle. This is accomplished by determining which area has two, but only two, control bits on. This is accomplished by ANDing in AND circuit 60, $\overline{\text{T12}}$, T13 and T14. In AND circuit 62, $\overline{\text{T13}}$ is ANDed with T12 and T14, whereas in AND 64, $\overline{\text{T14}}$ is ANDed with T12 and T13. The outputs of the ANDs 60, 62, 64 are ORed together in OR circuit 66, the output of which energizes one leg of an AND circuit 68. The other leg of AND circuit 68 is energized by the area 1 full latch condition. Thus, if the area is full and any two bits, but only two control bits, are on, then the area 1 third-in line is energized. Similar circuitry is provided for the remaining columns corresponding to areas 2, 3, and 4.

Figure 7:
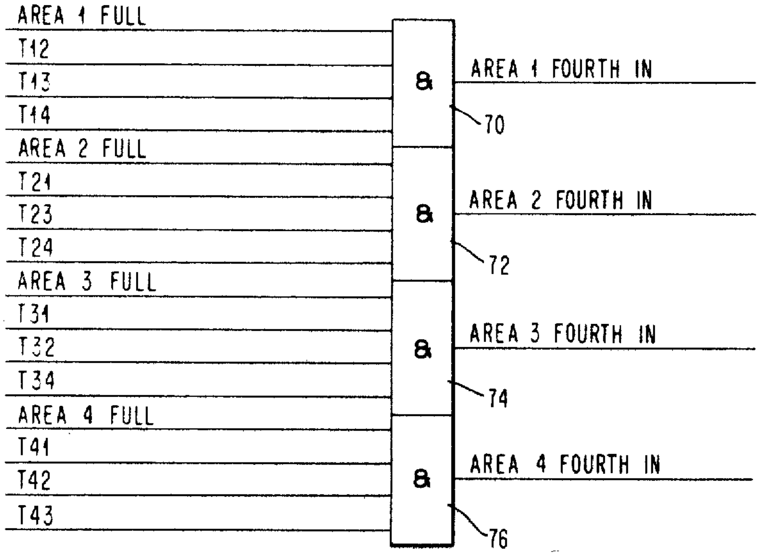
FIG. 7 is a decoder circuit for decoding outputs from the register and matrix of FIG. 3 for indicating the memory area which was loaded fourthly.

FIG. 7 illustrates the circuitry necessary to decode which area was loaded fourthly in a sequence. This is accomplished by ANDing all of the sequence control bits associated with a particular area with the area-full latch condition. For example; T12, T13, and T14 are ANDed with the area 1 full condition in AND circuit 70 to signify that area 1 was loaded fourthly. Similarly, in AND circuits 72, 74, and 76, the area 2, 3, and 4 conditions are met. Thus, if all of the sequence control bits in a column are on and the area-full latch for the area associated with the column is on, then that area was loaded fourthly in the cycle.

Figure 4:
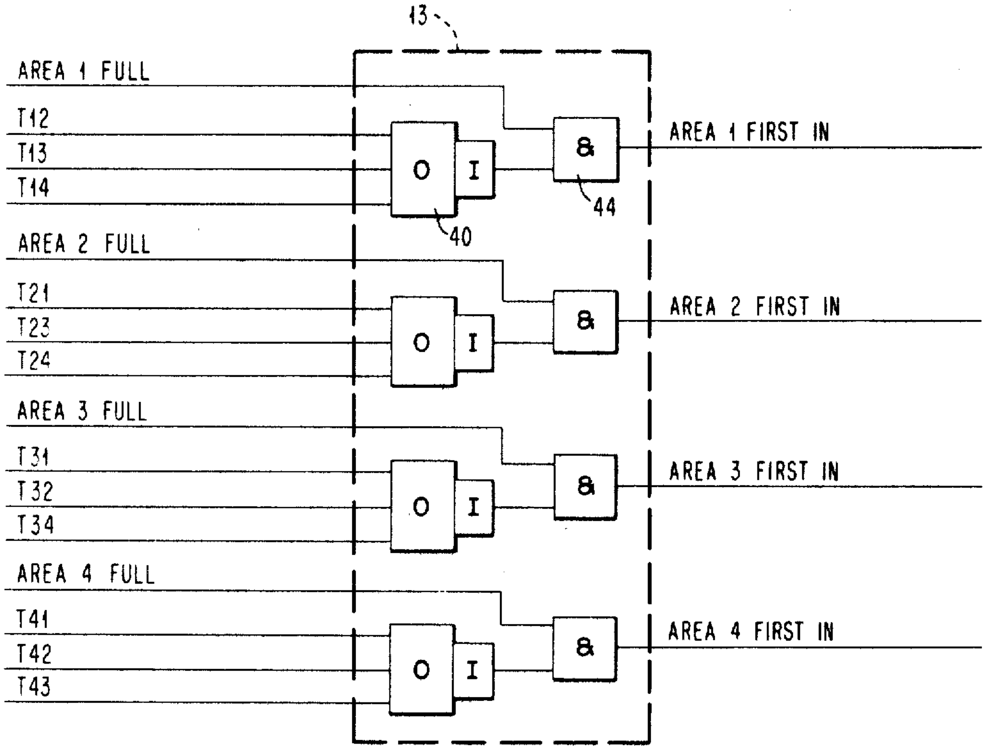
FIG. 4 is a decoder circuit for decoding outputs from the register and matrix of FIG. 3 for indicating the memory area which was loaded firstly.
Figure 8:
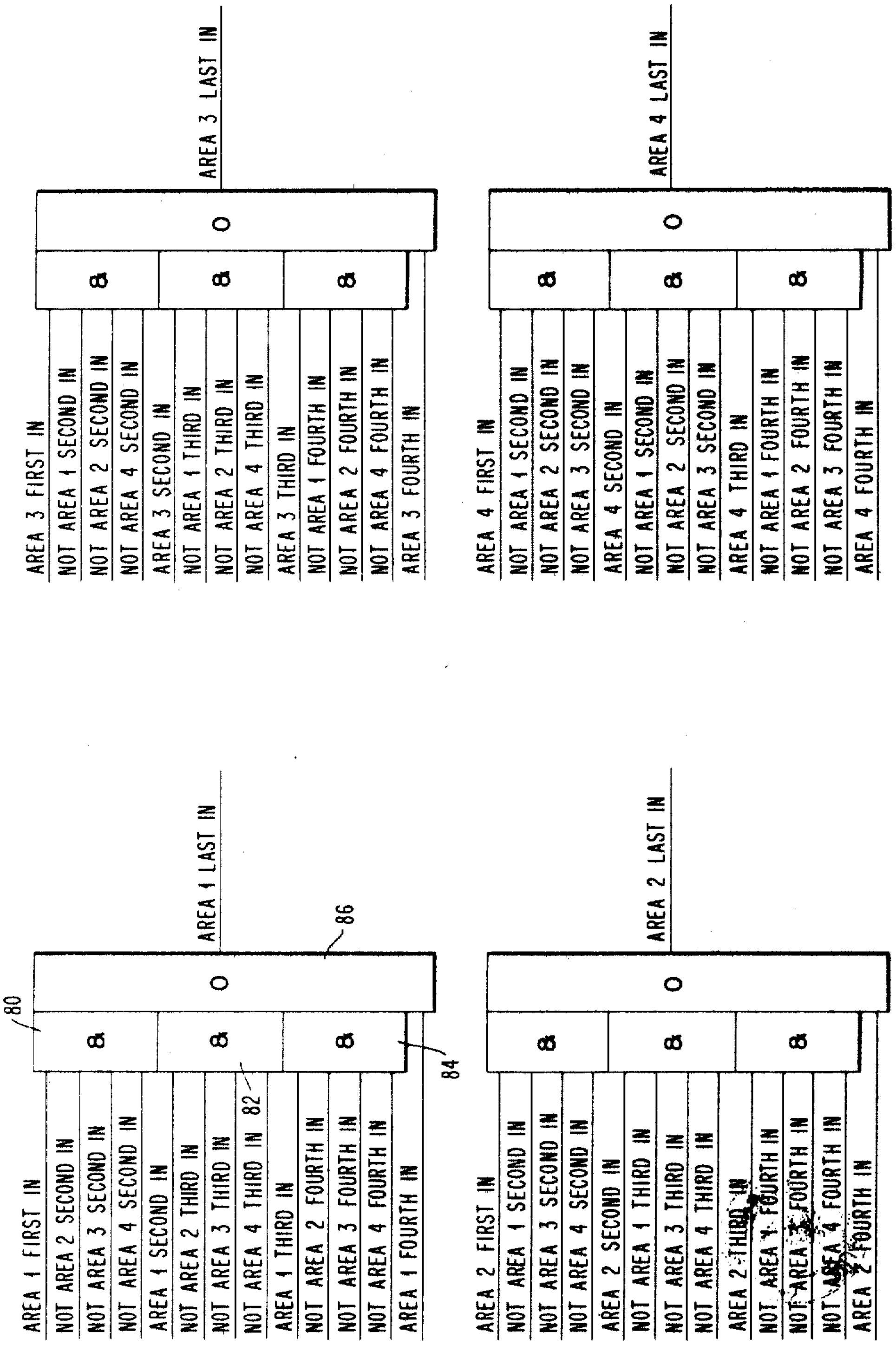
FIG. 8 is a decoder circuit illustrative of the type necessary to decode which memory was loaded "last-in."

FIG. 8 illustrates a last-in, first-out sequence decoder. Since a full four cycles may not be taken, the last-loaded memory area is not always indicated by the decoder shown in FIG. 7, which only decodes the area which was loaded fourthly. It is possible that only three areas or two areas were loaded. In the event that it is desired to read out the area loaded last-in, it is necessary to construct a decoder such as that shown in FIG. 8. The area 1 first-in line from FIG. 4 is ANDed in AND circuit 80 with not-area 2 second-in, not-area 3 second-in; and not-area 4 second-in. (For simplicity, in the drawings inverters have been omitted on these "not" lines, but a person having ordinary skill in the art may add such inverters where necessary). The area 1 second-in line from FIG. 5 is ANDed with not-area 2 third-in, not-area 3 third-in, and not-area 4 third-in in AND circuit 82. The area 1 third-in line from FIG. 6 is ANDed with not-area 2 fourth-in, not-area 3 fourth-in, and not-area 4 fourth-in in AND circuit 84. The outputs of the AND circuits 80, 82, 84 are ORed in OR circuit 86 together with area 1 fourth-in to complete all the conditions necessary to specify that area 1 was the last area loaded. Similar circuitry is provided for areas 2, 3, and 4.

In summary, one embodiment of the invention is shown in FIG. 1. Each individual memory area 1, 2, 3, 4 of the memory 10 is provided with an area-full tag V1, V2, V3, V4 stored in a full tag register 12. Each individual memory area also has a control bit register which may be a column of the sequence matrix 14. The control bits identify each of all the remaining memory areas to be controlled. The outputs of the full tag register 12 and the sequence control bits in sequence matrix 14 are combined in a sequence decoder 13 to generate output lines which may indicate which register was loaded first-in, last-in, or any other desired sequence, as illustrated by a few examples of such decoder circuits shown in FIGS. 4, 5, 6, 7, and 8.

When an individual memory area is loaded, its area-full tag is turned on. All remaining areas which have information stored in them and thus have area-full tag bits on are signalled in such a manner as to turn on the bit control positions in the column associated with the memory area being filled.

Whenever information is read from the memory area, the area-full tag is reset and all the control bits in the row corresponding to the memory area read are reset.

Sequence control information is derived from the status of the full tag register and the sequence control bits. The number of control bits on plus one indicates the numerical sequence in which the information was entered into the memory. Thus, if no control bits are on, and the tag bit is on for a particular memory area, that individual memory area was loaded first-in; if one, and only one, control bit is on, the memory area was second-in, etc.

The above described invention may be easily applied to a program controlled memory and it is not limited to the particular sequence control matrix shown in FIG. 3. The latches in FIG. 3 used to store bits of information may be replaced by a program-controlled computer in which, for example, magnetic memory core elements or other storage media are used to retain the status of the control bits. Further, the control bits and the area-full tag bits may be made part of a control word associated with each segment of information to be stored in a memory. In this event, it is not necessary to have actual latches associated with each control bit.

Furthermore, the control word may be continuously circulated in a recirculating memory which may comprise a delay line and appropriate apparatus for recirculating and storing bits in the delay line. Or it may be a magnetic drum, magnetic tape, or any other type of storage device in which binary digits of information may be stored and altered under control of a computer program or under control of logic circuitry.

While the invention has been particularly shown and described with reference to a preferred embodiment thereof, it will be understood by those skilled in the art that the foregoing and other changes in form and details may be made therein without departing from the spirit and scope of the invention.

In the claims:

1. Sequence control apparatus for controlling the sequence of loading and unloading a plurality of *n* individual memory areas, comprising:
   a plurality of *n* means for storing individual memory area-full tags;
   means for storing groups of sequence control bits, each group associated with an individual memory area, each bit in a group identifying one of all the remaining areas controlled;
   signalling means for turning on the area-full tag of an individual memory area upon the condition that said area has data stored therein; and,
   means responsive to said signalling means for turning on the sequence control bit positions in the group corresponding to the just-loaded memory area, which bit positions correspond to all other memory areas which have full tag bits on.

2. The combination according to claim 1 including read signalling means for causing information to be removed from an individual memory area;
   and means operative upon said removal to turn off the area-full tag of that individual memory area and the sequence control bit positions identifying that individual memory area in each group of control bits.

3. The combination according to claim 1, including means responsive to the state of said sequence control bits for indicating in which sequence the individual memory areas were loaded.

4. The combination according to claim 3 wherein the sequence decoder indicates which area was loaded firstly and is comprised of means for generating an output when the area-full tag associated with an individual memory area is on and none of the sequence control bits associated with that area is on.

5. The combination according to claim 3 wherein said sequence decoder includes means for indicating which area was loaded *k*-thly in a sequence *l* . . . *k* . . . *n* comprising means for combining the condition that a group of sequence control bits has *k–l* and only *k–l* control bits on, with the condition that the associated area-full tag is on.

6 The combination according to claim 3 wherein said sequence decoder includes means for indicating which area was loaded *n*-thly comprising means for combining the condition that the area-full tag is on with the condition that all of the sequence control bits associated with the individual memory area are on.

7. A sequence control matrix for controlling the sequence of loading and unloading *n* registers comprising:
   a register-full storaged device associated with each register for indicating that the register is full;
   a matrix of storage devices arranged in *n* columns and *n* rows;
   signalling means for turning on the register-full device of a particular register *k* upon the condition that the register is full; and,
   means responsive to said signalling means for turning on all storage devices in column *k* of said matrix in all rows which have register-full storage devices on.

8. The combination according to claim 7 including read signalling means for causing information to be removed from a register and means operative upon such removal to turn off the register-full storage devices associated with that register and for turning off all storaged devices in the row of the matrix corresponding to the register from which the information is removed.

9. Sequence control apparatus for controlling the sequence of loading and unloading a plurality of *n* individual memory areas, comprising:
   a plurality of *n* means for storing individual memory area-full tags;
   a matrix for storing sequence control bits, a row and a column associated with each individual memory area, each bit in a column identifying one of all the remaining areas controlled;
   signalling means for turning off the area-full tag of an individual memory area upon the condition that said area has data stored therein; and,
   means responsive to said signalling means for turning on the sequence control bit positions in the matrix column corresponding to the just-loaded memory area, which bit positions correspond to all other memory areas which have full tag bits on.

10. The combination according to claim 9 including read signalling means for causing information to be removed from an individual memory area;
   and means operative upon said removal to turn off the area-full tag of that individual memory area and the sequence control bit positions in the row associated with that individual memory area.

11. The combination according to claim 10 including means responsive to the state of said sequence control bits for indicating in which sequence the individual memory aeas were loaded.

12. The combination according to claim 11 wherein the sequence decoder indicates which area was loaded firstly and is comprised of means for generating an output when the area-full tag associated with an individual memory area is on and none of the sequence control bits in the column associated with that area is on.

13. The combination according to claim 11 wherein said sequence decoder includes means for indicating which area was loaded *k*-thly in a sequence *l* . . . *k* . . . *n* comprising means for combining the condition that a column of sequence control bits has *k–l* and only *k–l* control bits on, with the condition that the associated area-full tag is on.

14. The combination according to claim 11 wherein said sequence decoder includes means for indicating which area was loaded *n*-thly comprising means for combining the condition that the area-full tag is on with the condition that all of the sequence control bits in the column associated with the individual memory area are on.

15. A sequence control matrix for controlling the sequence of loading and unloading *n* registers comprising:
   a register-full storage device associated with each register for indicating that the register is full;
   a matrix of storage devices arranged in *n* columns and *n* rows;
   signalling means for turning on the register-full device of a particular register *k* upon the condition that the register is full;
   means responsive to said signalling means for turning on all storage devices in column *k* of said matrix in all rows which have register-full storage devices on;
   a sequence decoder responsive to the state of said storage devices for indicating in which sequence the registers were loaded;
   read signalling means for causing information to be removed from registers in a sequence indicated by said sequence decoder;
   and means operative upon such removal to turn off the register-full storage device associated with each register from which information is removed and for turning off all storage devices in the row of the matrix corresponding to the register from which the information is removed.

16. The combination according to claim 5 wherein said sequence decoder includes means responsive to said indicating means for determining which area was loaded lastly by combining the condition that the area was $k$th in with the condition that all other areas were not loaded after said area.

17. The combination according to claim 13 wherein said sequence decoder includes means responsive to said indicating means for determining which area was loaded lastly by combining the condition that the area was $k$th in with the condition that all other areas were not loaded after said area.

References Cited

UNITED STATES PATENTS

| | | | |
|---|---|---|---|
| 3,191,155 | 6/1965 | Seeber et al. | 340—172.5 |
| 3,230,512 | 1/1966 | Seeber et al. | 340—172.5 |
| 3,234,524 | 2/1966 | Roth | 340—172.5 |
| 3,289,171 | 11/1966 | Scherr et al. | 340—172.5 |

PAUL J. HENON, *Primary Examiner.*

RAULFE B. ZACHE, *Assistant Examiner.*

PO-1050
(5/69)

UNITED STATES PATENT OFFICE
CERTIFICATE OF CORRECTION

Patent No. 3,441,908 Dated April 29, 1969

Inventor(s) John V. Mizzi

It is certified that error appears in the above-identified patent and that said Letters Patent are hereby corrected as shown below:

Column 7, line 72, the word "devices" should read --device--.
Column 8, line 10, the word "off" should read --on--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents 523-2721-0